Patented June 13, 1944

2,351,309

UNITED STATES PATENT OFFICE 2,351,309

BOTTLE LABEL ADHESIVE

Robert C. White, Bainbridge, N. Y., assignor to The Borden Company, New York, N. Y., a corporation of New Jersey No Drawing. Application February 24, 1943, Serial No. 476,979

6 Claims. (Cl. 106—146)

The present invention is concerned with a new adhesive for the labeling of bottles, and particularly such bottles as are to be contacted with water or ice while labeled, for a sufficient time to chill the contents of the bottles (beverages, etc.). The invention especially relates to a novel adhesive particularly suitable for employment in the labeling of bottles for such beverages or other products as are to be chilled in the bottles, before and at the time of serving. As examples of such beverages, soft drinks and beer may be mentioned, and as is well known, it is customary to place bottles of such beverages in broken ice or in ice water for a time of several hours to several days, before serving the same. It sometimes happens that the labels detach themselves from the bottles during this contact with the water. It sometimes happens that the ice becomes wholly melted and the resulting water warms up somewhat, sometimes up to about room temperature, while in contact with the labeled bottles. Many of the previously used adhesives are much less resistant to such warmed water than to ice water, and labels are particularly subject to becoming detached from the bottles, under these conditions.

The invention is an improvement on copending case Serial No. 411,250, filed September 17, 1941, by John Corwin and myself. In said copending case we have described various advantages obtained by that invention. I have now found it possible to produce even greater advantages by my present invention. One object of this invention is to produce a more tacky adhesive which still further prevents labels from curling away from bottles during labeling operations. A further object is to produce a glue which is still less affected by temperature changes in the surrounding air, at the place of application, than is the case in the copending case. Another object is to obtain an increased coverage of labels per pound of adhesive. A still further object is to produce an adhesive which gives a still greater improvement in the "sharp cut" or transfer of the adhesive between the transfer and gum rolls, which in turn prevents, to a still greater extent, webbing and stringing of the adhesive than can be obtained in the copending case. Other objects of the invention will be apparent from the following description and claims.

My invention embraces a paste adhesive comprising organic amides, water-soluble alkaline solvents of casein, compounds of zinc and linseed meal, as set forth herein. In using the term "organic amide," I mean to include amides such as urea, formamide, thio-urea, ammonium thio-cyanate, acetamide and the like. By the term "alkaline solvents" herein, I mean such water-soluble alkaline compounds or salts or hydroxides of sodium, potassium or ammonium, which (used alone or with organic amides) have a solubilizing action on casein. Under the term "zinc compounds" herein, I include any of the known compounds of zinc, and especially zinc oxide, zinc hydroxide, zinc carbonate, zinc ammonium chloride, zinc acetate and the like. In referring to "linseed meal," I mean to imply a linseed meal from which all, or all but a small percentage of the oil contained in such meal has been removed, i. e. the meal made by the usual hydraulic pressing, well known in the art, or the so-called expeller type meal, or the solvent extracted meal. I prefer, however, to use the hydraulic pressed type of linseed meal.

The adhesive described and claimed in the copending application 411,250 contains the above components, except the linseed meal, in about the proportions shown herein.

In order to more fully explain the nature of this invention, I give herewith various examples showing how my preferred product (adhesive paste) may be made, but I do not limit the scope of this invention to the examples cited, these being offered only by way of illustration. All parts are given by weight.

Example 1

| | Parts |
|---|---|
| Casein (air-dry, preferably ground to 24 mesh) | 200 |
| Linseed meal (preferably ground to 100–200 mesh) | 30 |
| Zinc oxide | 11.2 |
| Urea | 177.4 |
| Ethyl para hydroxy benzoate (preservative) | 2.22 |
| Water | 707 |
| Tributyl citrate (used as a foam abater) | 2.22 |
| Commercial ammonia water 26° Bé | 6.66 |

The procedure may be as follows:

Into a jacketed kettle place the cold water, add the casein and the linseed meal, zinc oxide, tributyl citrate and ethyl para hydroxy benzoate. Mix thoroughly to wet the particles and to free the mixture from lumps, as much as possible. This may require about 10 minutes, then add the urea, mix for 5 minutes and then at once add the ammonia. With continued stirring, heat the mixture (e. g. by steam or hot water in the jacket), to approximately 180° F., and the material is then finished, the casein having been completely dissolved, the linseed meal having been dispersed in a satisfactory manner. The action complete, and the hot labeling paste resulting is immediately drawn from the mixing kettle, preferably, first run through a strainer of about 24 mesh and placed in receptacles, e. g. drums, for storage or shipment. The mixture will then cool to atmospheric temperature.

The benzoate is a preservative that is not harmful to the casein. Other preservatives, not harmful to casein, can be substituted, for example para chlor meta cresol and carvacrol.

Other foam abating agents, instead of tributyl citrate, can be used, e. g. pine oil, tributyl phosphate, octyl alcohol or capryl alcohol.

*Example 2*

Same formula and same method of procedure as in Example 1, with the exception that 177.4 parts of ammonium thio-cyanate are substituted for the urea.

*Example 3*

Same as Example 1 with the exception that 177.4 parts of thiourea are substituted for the same amount of urea.

*Example 4*

Sam as Example 1 excepting 177.4 parts of formamide are substituted for the urea.

*Example 5*

Same as Example 1 except that 11 parts of soda ash are substituted for the ammonia water in Example 1.

*Example 6*

Same as Example 1 but substituting 10 parts of commercial trisodium phosphate in place of the ammonia water in Example 1.

*Example 7*

Same as Example 1 but substituting 18 parts of commercial borax in place of the ammonia water recommended in Example 1.

*Example 8*

Same as Example 1 but substituting 4 parts of sodium hydroxide for the ammonia water in Example 1.

*Example 9*

Same as Example 1 but substituting 12 parts of tetra sodium pyrophosphate for the ammonia water appearing in Example 1.

*Example 10*

Same as Example 1 but substituting 10 parts of triethanolamine in place of the ammonia water appearing in Example 1.

*Example 11*

| | Parts |
|---|---|
| Casein | 200.0 |
| Linseed meal | 30.0 |
| Zinc oxide | 20.0 |
| Urea | 180.0 |
| Ethyl para hydroxy benzoate | 2.22 |
| Water | 488.0 |
| Tributyl citrate | 2.0 |
| 26° Bé. ammonia water | 8.0 |

*Example 12*

| | Parts |
|---|---|
| Casein | 200.0 |
| Linseed meal | 30.0 |
| Zinc oxide | 11.2 |
| Urea | 177.4 |
| Bentonite | 30.0 |
| Ethyl para hydroxy benzoate | 2.22 |
| Water | 707.0 |
| Tributyl citrate | 2.22 |
| 26° Bé. ammonia water | 7.0 |

*Example 13*

| | Parts |
|---|---|
| Casein | 200.0 |
| Linseed meal | 30 or 15.0 |
| Zinc acetate | 11.2 |
| Urea | 177.4 |
| Ethyl para hydroxy benzoate | 2.22 |
| Water | 707.0 |
| Tributyl citrate | 2.22 |
| 26° Bé. ammonia water | 16.0 |

*Example 14*

| | Parts |
|---|---|
| Casein | 200.0 |
| Linseed meal | 15.0 |
| Zinc oxide | 56.0 |
| Urea | 177.4 |
| Ethyl para hydroxy benzoate | 2.22 |
| Water | 662.2 |
| Tributyl citrate | 2.22 |
| 26° Bé. ammonia water | 6.66 |

*Example 15*

| | Parts |
|---|---|
| Casein | 200.0 |
| Linseed meal | 15.0 |
| Zinc ammonium chloride | 10.0 |
| Urea | 177.4 |
| Ethyl para hydroxy benzoate | 2.22 |
| Water | 707.0 |
| Tributyl citrate | 2.22 |
| 26° Bé. ammonia water | 6.66 |

The procedure of Example 1 can be followed in Examples 2 to 11 and 13 to 15, and in Examples 16 and 17, given below.

It will be noted that Example 12 discloses the addition of a small amount of bentonite to the formula. The procedure of preparation is therefore somewhat different than indicated in Example 1, and a satisfactory method is to proceed as follows:

Of the 707 parts of water indicated in the formula, I take 210 parts to which I add the 30 parts of bentonite. By means of a high speed stirrer or other convenient mixing device, the bentonite is dispersed in this cold water until the bentonite and water become a perfectly smooth, uniform paste. Thereafter, this bentonite mixture may be added to 497 parts of water and thoroughly mixed. Thereafter, the procedure is as in Example 1, but the 737 parts of the thinned bentonite suspension are added, instead of water alone.

In following this invention it may be sometimes desirable to use more or less of the ground linseed meal in the formulas than is indicated in the above examples. The use of the linseed meal in these compositions tends to give a somewhat greater body to the resulting finished paste without reducing the desirable characteristics of the product, and even substantially improving these characteristics. However, for some particular type of labeling machines, or because of the type of paper used in making certain labels, it may be desirable to vary the amount of linseed meal somewhat and I, therefore, give the following examples. All parts are by weight.

*Example 16*

| | Parts |
|---|---|
| Casein | 200.0 |
| Finely ground linseed meal | 20.0 |
| Zinc oxide | 11.2 |
| Urea | 177.4 |
| Ethyl para hydroxy benzoate | 2.2 |
| Water | 707.0 |
| Tributyl citrate | 2.22 |
| Commercial ammonia water 26° Bé | 6.66 |

Procedure of operation the same as given in Example 1.

Example 17

| | Parts |
|---|---|
| Casein | 200.0 |
| Linseed meal | 40.0 |
| Zinc oxide | 11.2 |
| Urea | 177.4 |
| Ethyl para hydroxy benzoate | 2.22 |
| Water | 707.0 |
| Tributyl citrate | 2.22 |
| Commercial ammonia water 26° Bé | 6.66 |

Procedure for making the same as in Example 1.

Obviously various other percentages of linseed meal (e. g. 5 to 25%, based on the amount of casein), may be used if desired.

I find that label pastes made according to this invention possess exceptionally interesting properties, even to a greater extent than is disclosed in the copending case. Bottles labeled with the product of this invention resist the action of ice or ice water perfectly for many days, and even when tested in water at room temperature, or somewhat higher (e. g. 70 to 85° F.), bottles labeled with this adhesive show no failure or separation from the bottles after four or five days.

Some of the outstanding advantages possessed by the product of this invention to a greater degree than the product described in the copending case are as follows:

(1) The product of this invention is more tacky, thus shows greater advantage in preventing the labels from curling away from the bottles immediately after application, and this is particularly true in the case of difficult labeling operations, as where the label with the wet adhesive paste applied shows a great tendency to curl up.

(2) The application of the adhesive is easier (compared with that of Ser. No. 411,250), because the product of this invention is less affected by temperature variations so that the same grade of material made according to this invention, so far as consistency of the adhesive paste and the per cent solids is concerned, can be manufactured and used under cold factory conditions, such as 48° F., or under relatively hot factory conditions, such as 80° F., with excellent performance.

(3) My improved adhesive will give greater coverage than it is possible to obtain in the copending application. In actual factory operations I am able to obtain approximately 20% greater coverage, that is to say, 80 pounds of the product of this invention (i. e. the adhesive paste), will label as many bottles as 100 pounds of the product described in the copending application.

(4) The product of this invention has the property of clinging especially well to the pickers on high speed labeling machines and thus tends to eliminate to a very marked degree the usual wasteful flowing and dripping of glue over machine and floor.

(5) An outstanding feature of this invention is the noted "sharp cut" of the adhesive between the transfer and gum rolls of the labeling machine, thus preventing, almost entirely, tendency for webbing and stringing.

(6) The product of this invention has outstanding qualities from the standpoint of non-settling and remaining in a uniform consistency over many months.

As in the copending case, the adhesive paste can be shipped and kept for a considerable time such as six or eight months, without putrefactive fermentation and without considerable change in consistency, and without losing its valuable properties as outlined above. This feature is most unusual, since ordinary liquid casein glues have a very short working life, e. g. a few hours, or in some case up to 2–3 days. Accordingly, heretofore it has been the usual practice to make up liquid casein glues just before the time for use, e. g. to purchase "casein glue base" (e. g. a dry mixture of casein, lime, soda salts, etc.) and to mix this with water or alkaline solutions, just before use.

In actual tests of the glues made in accordance with the present invention, it has been demonstrated that paper labels applied with this adhesive paste to glass bottles and dried, would resist the action of ice water for several days (often a week or more) and would resist the action of water at normal room temperature (70°–80° C.) for several days (often a week or more), without showing any tendency to become detached from the bottles.

Prior to the invention of the parent case 411,250, casein glues had not been commercially used in labeling bottles to be chilled in ice water, before serving. The most satisfactory glues previously used for that purpose were mixed animal glue and starch. Such adhesives, after applying the label therewith and drying, are well known to be resistant to ice water, for several days, but are liable to come off the bottles in a very short time, if the ice all becomes melted and the water warms up, e. g. to 60–70° F.

I am of course aware that heretofore seed-meals (including linseed meal), have been incorporated in casein glues, usually as a cheapening agent, but it was surprising to find that in the present case, many of the properties of the adhesive are markedly improved by adding linseed meal, in an amount that is, at most, only a minor fraction of the amount of casein. That such amount of linseed meal would improve the casein glue of the parent case, is regarded as most unexpected.

I have referred above, to the use of linseed meal. In numerous prior patents, dealing with other types of glue, seed meals of high protein content have been used with casein, examples of such being soybean, peanut and cottonseed meals. Some of the said patents also mention linseed meal. In the present invention, these other seed meals of high protein content do not function similarly to linseed meal and hence are not the equivalent thereof. No claim is made herein to the use of such other meals, as a substitute for linseed meal.

In many of the casein glues of the prior art, lime (usually employed as hydrated lime) has been added as an alkaline material. I do not use lime or other alkaline-earth bases (including magnesium oxide or hydroxide) in any of the glues of the present invention, and the addition of lime to any of the formulas herein, or the substitution of lime or other alkaline-earth bases for all or a substantial part of the alkaline materials used herein would destroy the useful properties of the glue, for the purpose indicated. In other words, the use of alkaline-earth bases in the present case would destroy (1) the keeping qualities of the adhesive paste and (2) the resistance of the glued labels to the action of ice water and water at or near room temperature. I do not state that the entire composition is entirely free from calcium compounds, since ordinary dried casein contains some calcium (in combined form), but the adhesives covered in this application, are "free from added lime" and "free from added alkaline-earth bases," in order to be stable and useful for the purposes indicated.

As an illustration of this, a glue was made up similar to Example 6 above, but using 4 parts of hydrated lime and 3 parts of trisodium phosphate (i. e. a part of the trisodium phosphate being substituted by lime). The liquid glue was wholly unsatisfactory, both as to keeping qualities and water resistance of the labels fastened therewith to bottles.

Accordingly I disclaim glues containing added lime or added alkaline-earth base.

The linseed meal should best be finely ground. Preferably I use a linseed meal of which 90% of the total will pass a 200 mesh screen, and practically all of it will pass a 100 mesh screen. But I do not restrict the invention to this degree of fineness. The amount of oil left in the meal, for use in the present invention is low, preferably not over 3 to 4%. If solvent extracted linseed meal is available, that seems to be best. Solvent extracted linseed meal may contain below 0.5% of residual oil. Linseed meal is a by-product of the manufacture of linseed oil, and the linseed oil manufacturers usually try to get out as much of the oil as possible.

I claim:

1. An adhesive paste suitable for labeling bottles, such adhesive containing water as its largest component, casein, an organic amide in an amount which is a major fraction only of the amount of said casein, said amide constituting the major component of the casein dissolving agent, a zinc compound in an amount which is only a minor fraction of the amount of said amide, and a water soluble alkaline solvent in an amount that, with said amide, will dissolve said casein, and fine linseed meal in an amount less than the amount of said casein, such adhesive paste being free from added alkaline-earth bases, and having a working life of at least several months, and such adhesive paste giving to paper labels attached therewith to glass bottles and dried, the property of resisting the action of ice water and water at about normal room temperature, for at least several days.

2. An adhesive paste suitable for labeling bottles to be chilled in water, comprising

| | Parts |
|---|---|
| Casein | 200 |
| Fine linseed meal | About 20 to 40 |
| A zinc compound | About 10 to 20 |
| An organic amide | About 175 to 200 |
| A water soluble alkali, equivalent to about 6 to 16 parts of ammonia water of 26° Bé, | |
| Water | About 488 to 707 parts, | and such adhesive paste being free from alkaline-earth bases, such adhesive paste being stable in storage for at least several months.

3. An adhesive paste suitable for labeling bottles to be chilled in cold water, such adhesive paste comprising water as its largest component, casein constituting the largest solid component, a smaller amount of linseed meal, an organic amide constituting the largest component of the casein dissolving agent, a zinc compound in an amount much less than the amount of said amide and a water soluble alkali in an amount less than the amount of said amide but in an amount sufficient, with said amide to dissolve said casein, such adhesive paste being free from added alkaline earth bases.

4. A stable adhesive paste for labeling bottles to be chilled in cold water, such adhesive containing water as its largest component, casein as its largest solid adhesive component, an amount of an organic amide which is not considerably more than the amount of said casein but is at least about ⅞ of the amount of said casein, linseed meal in an amount which is only a minor fraction of the amount of said casein, a zinc compound in an amount that is only a minor fraction of the amount of said amide, and an amount of a water soluble alkali that is sufficient in conjunction with said amide to dissolve said casein, such adhesive paste being free from added basic alkaline earth compounds.

5. An adhesive as covered in claim 2, also containing about 20 to 50 parts of bentonite.

6. An adhesive as covered in claim 1, also containing bentonite in an amount which is only a minor fraction of the amount of said casein.

ROBERT C. WHITE.